UNITED STATES PATENT OFFICE.

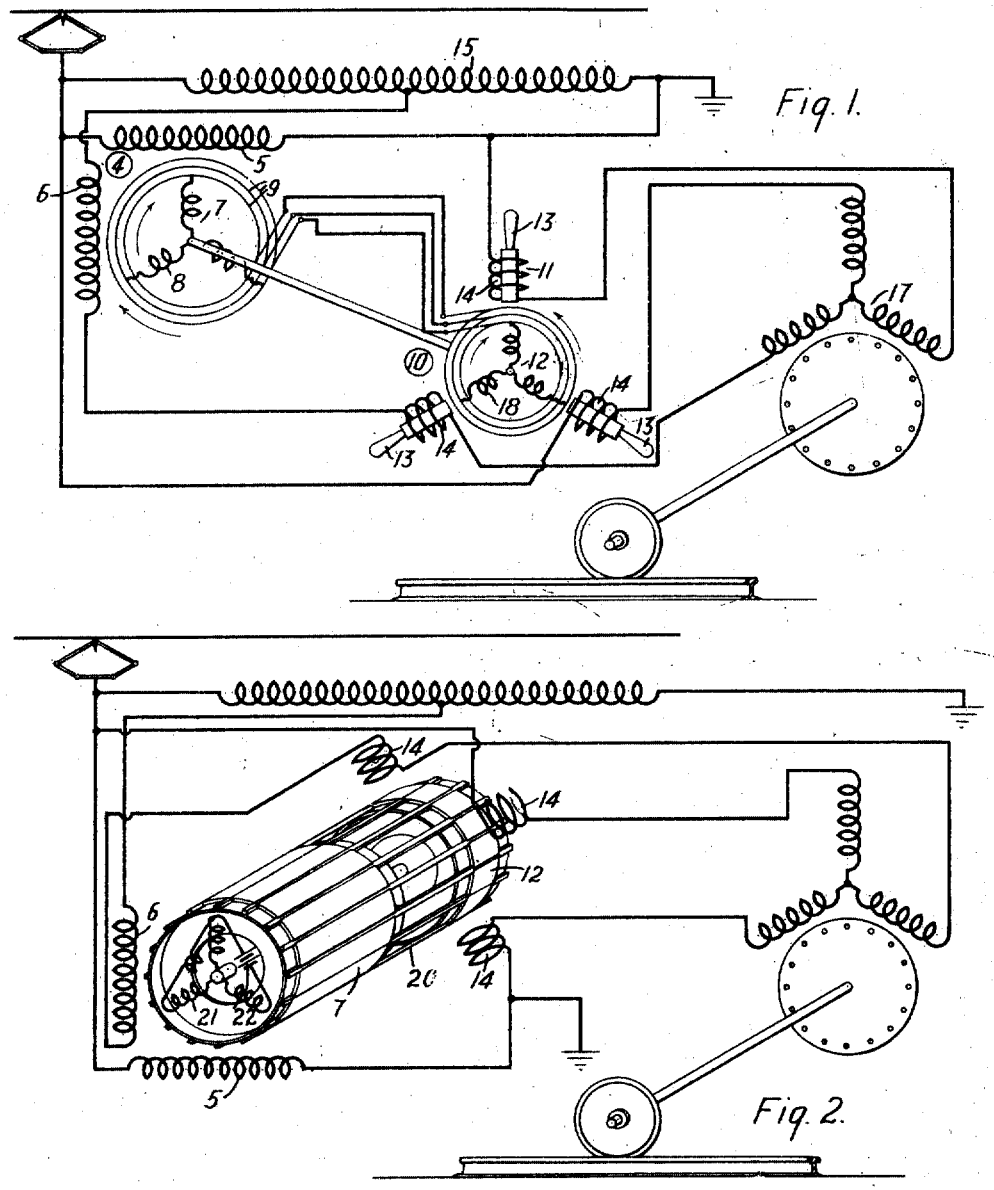

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

EXCITING SYSTEM FOR PHASE-CONVERTERS.

1,281,955. Specification of Letters Patent. Patented Oct. 15, 1918.

Application filed August 7, 1916. Serial No. 113,457.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Exciting Systems for Phase-Converters, of which the following is a specification.

My invention relates to exciting systems for phase-converters, particularly of the T-connected, rotary type, and it has for its object to provide systems of the character designated wherein double-frequency electromotive forces for urging the working current through the rotor circuits of said phase-converter may be produced in a simple and effective manner.

Another object of my invention is to provide means, in a system of the character designated, whereby a unidirectional electromotive force may also be produced for supplying direct exciting current to the rotor windings of said phase converter for synchronous operation and phase compensation therein.

In the accompanying drawing, Figure 1 is a diagrammatic view of a phase-converter provided with certain coördinating elements, together constituting a system embodying my invention; Fig. 2 is a diagrammatic view of a modification of the system shown in Fig. 1, and Fig. 3 is a fragmentary view, partially in section and partially in elevation, of a composite dynamo-electric machine employed in the system of Fig. 2.

In my copending application, Serial No. 108,567, filed July 11, 1916, I have disclosed and claimed means whereby double-frequency exciting currents may be supplied to the rotor winding of a phase-converter for urging the working currents therethrough, the particular exciting machines employed being of the commutator type. By supplying exciting currents of the character designated, the drops in the various portions of the phase-converter may be compensated for and the phase-converter may be given compounding characteristics of any desired form.

In my copending application, Serial No. 113,454 filed Aug. 7, 1916, I have disclosed and claimed systems similar to those just mentioned but, in addition, means are provided for supplying unidirectional exciting current to the rotor winding of the phase-converter in order to cause the same to operate in synchronism so that phase compensation may be effected.

By the present invention, I provide systems of the general character above described but the auxiliary exciting machine employed is of the induction type, thus doing away with commutation difficulties. By causing the rotor of the exciter machine to rotate in the same direction and at the same speed as the rotor of the phase converter and by supplying the stator winding of the auxiliary exciter with alternating current from the terminals of the phase converter, the connections being such that the resultant rotating field in the stator of said auxiliary exciter rotates in the opposite direction from the rotor thereof, there are produced in the rotor winding of the exciter machine double-frequency currents sutable for the compounding of the main phase-converter.

Other details of my invention will hereinafter more fully appear.

Referring to Fig. 1 for a more detailed understanding of my invention, I show a phase-converter of the T-connected rotary type at 4, said phase-converter having a primary stator winding 5, a secondary stator winding 6 and a rotor 7 provided with a star-connected rotor winding 8. The outer terminals of the rotor 8 are connected, respectively, to suitable slip rings 9 for connection to external circuits.

An auxiliary machine 10, of the induction type, is provided for exciting purposes and comprises a stator member 11 and a rotor member 12. The stator winding 11 is phase wound and the magnetic axes of the various poles 14—14 thereof may be adjusted circumferentially by any suitable means as, for example, by mechanical movement thereof through suitable handles 13 or by forming a distributed winding on the stator member and adjusting the points of connection thereof, as shown in Patent No. 1,186,818, issued to the Westinghouse Electric & Manufacturing Company on June 13, 1916, on an application filed by F. W. Meyer.

The rotor member of the auxiliary exciter machine is mounted on the shaft of the phase-converter and turns therewith.

Energy for the operation of the phase-converter is supplied from any suitable source 15, such, for example, as a transformer winding, and energy derived from the secondary winding 6 is combined with energy derived directly from the supply winding for the energization of a polyphase load circuit, such, for example, as a propulsion motor of the polyphase induction type shown at 17. The various divisions 14—14 of the stator winding of the auxiliary exciter machine are inserted, respectively, in the leads between the phase-converter 4 and the load 17, the relative connections being such that the rotating field established in the stator member of the exciter machine rotates in the opposite direction from the rotor thereof. A double-frequency electromotive force is accordingly generated in the rotor phase winding 18 of the exciter machine which is supplied to the rotor winding of the machine 4 through the usual slip rings and brushes.

It is frequently desirable to eliminate even slip rings, as their use necessitates frequent supervision for brush adjustment and lubrication. This result may be attained by forming the rotor members of the phase-converter and of the exciter machine into an integral structure, as indicated at 20 in Fig. 2. The left-hand or major portion of the composite structure 20, corresponding to the rotor member 7 of the phase converter 4 in Fig. 1, is subject to the influence of the stator primary and secondary windings 5 and 6, whereas the right-hand or minor portion 12 of the composite structure 20 is subject to the influence of the phase windings 14—14. The winding of the composite structure may now take the form of a squirrel-cage, as indicated in my copending application, serial No. 113,456, filed Aug. 7, 1916, and under these conditions, if the direction of rotation of the rotating field of the windings 14—14 is as previously described, suitable double-frequency currents are generated in the minor portion 12 of the composite structure 20 and are caused to circulate through the major portion 7 thereof to produce the desired compounding.

The major portion 7 of the composite structure 20 may be provided, in addition, with a phase winding 21 and direct-current excitation may be supplied thereto from any suitable source, as indicated at 22, for synchronous operation and for power-factor compensation, as described in detail in my application, Serial No. 113,454, filed Aug. 7, 1916.

The manner in which the various windings of the composite machine of Fig. 2 are mounted and disposed is indicated in Fig. 3 wherein the field frame is shown at 23 as supporting inwardly-projecting field-core members 24 and 25. The member 24 carries the stator windings 5 and 6 and, in like manner, the field member 25 carries the winding 14—14. The shaft of the machine is indicated at 26 and carries rotor core members 27 and 28 in alinement, respectively, with the field members 24 and 25. The squirrel-cage winding is shown at 29 and extends across the face of both rotor core members. The rotor core member 27 is provided, in addition, with the winding 21, as indicated in Fig. 2.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a source of alternating current, of a phase-converter of the rotary type connected thereto, an auxiliary dynamo-electric machine provided with a phase-wound stator and having its rotor mechanically coupled to the rotor of said phase-converter, connections whereby the rotating stator field of said auxiliary machine rotates in the opposite direction, with respect to the direction of rotation of the rotor, from the rotating stator field of said phase converter, and connections between the rotor windings of the two machines.

2. The combination with a source of alternating current, of a phase-converter of the rotary type having its primary winding connected thereto, an auxiliary dynamo-electric machine of the induction type, mechanical coupling means between the rotors of the two machines, electrical connections between the rotor windings of the two machines, and connections from the output terminals of the phase-converter through the stator winding of said auxiliary machine such that the rotating field thereof rotates in the opposite direction from that in which the rotor of said auxiliary machine is driven.

3. The combination with a source of alternating current, of a phase-converter of the rotary type having its primary winding connected thereto, an auxiliary dynamo-electric machine of the induction type, mechanical coupling means between the rotors of the two machines, electrical connections between the rotor windings of the two machines, connections from the output terminals of the phase-converter through the stator winding of said auxiliary machine such that the rotating field thereof rotates in the opposite direction from that in which the rotor of said auxiliary machine is driven, and means for adjusting the phase of the exciting currents supplied by said auxiliary machine to said phase-converter.

4. The combination with a source of alternating current, of a phase-converter of the rotary type having its primary winding connected thereto, an auxiliary dynamo-electric machine of the induction type, mechanical coupling means between the rotors of the two machines, electrical connections between the rotors of the two machines, connections from the output terminals of the phase-converter through the stator winding of said auxiliary machine such that the rotating field thereof rotates in the opposite direction from that in which the rotor of said auxiliary machine is driven, and means for moving the location of the magnetic axis of the poles of the stator of said auxiliary machine circumferentially, whereby the phase of the exciting currents furnished thereby to said phase-converter may be adjusted.

5. The combination with a source of alternating current, of a phase-converter of the rotary type having its primary winding connected thereto, an auxiliary dynamo-electric machine of the induction type, mechanical coupling means between the rotors of the two machines, electrical connections between the rotor windings of the two machines, connections from the output terminals of the phase-converter through the stator winding of said auxiliary machine such that the rotating field thereof rotates in the opposite direction from that in which the rotor of said auxiliary machine is driven, and additional means for supplying unidirectional current to the rotor of said phase-converter.

In testimony whereof I have hereunto subscribed my name this 21st day of July, 1916.

RUDOLF E. HELLMUND.